US008112310B1

(12) United States Patent
Yehoshua et al.

(10) Patent No.: US 8,112,310 B1
(45) Date of Patent: Feb. 7, 2012

(54) INTERNET ADVERTISING SYSTEM THAT PROVIDES RATINGS-BASED INCENTIVES TO ADVERTISERS

(75) Inventors: Tamar Yehoshua, Sunnyvale, CA (US); Owen Van Natta, Palo Alto, CA (US); Jonathan Leblang, Menlo Park, CA (US); Udi Manber, Palo Alto, CA (US); Ruben E. Ortega, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 1008 days.

(21) Appl. No.: 11/294,757

(22) Filed: Dec. 6, 2005

Related U.S. Application Data

(60) Provisional application No. 60/646,109, filed on Jan. 21, 2005.

(51) Int. Cl.
*G06Q 30/00* (2006.01)

(52) U.S. Cl. ..................................... 705/14.42

(58) Field of Classification Search ............. 705/10, 705/14, 26
See application file for complete search history.

(56) References Cited

U.S. PATENT DOCUMENTS

| | | | |
|---|---|---|---|
| 5,794,210 A | 8/1998 | Goldhaber et al. | |
| 5,950,172 A * | 9/1999 | Klingman | 705/26 |
| 6,260,064 B1 | 7/2001 | Kurzrok | |
| 6,525,747 B1 | 2/2003 | Bezos | |
| 6,785,671 B1 | 8/2004 | Bailey et al. | |
| 7,143,089 B2 | 11/2006 | Petras et al. | |
| 7,363,302 B2 * | 4/2008 | Lester | 707/7 |
| 2001/0025259 A1 * | 9/2001 | Rouchon | 705/26 |
| 2002/0023002 A1 * | 2/2002 | Staehelin | 705/14 |
| 2002/0032602 A1 * | 3/2002 | Lanzillo et al. | 705/14 |
| 2002/0111865 A1 | 8/2002 | Middleton et al. | |
| 2003/0036944 A1 | 2/2003 | Lesandrini et al. | |
| 2003/0046161 A1 * | 3/2003 | Kamangar et al. | 705/14 |
| 2003/0476152 | 3/2003 | Colas et al. | |
| 2003/0105682 A1 | 6/2003 | Dicker et al. | |
| 2003/0149937 A1 | 8/2003 | McElfresh et al. | |
| 2004/0044571 A1 | 3/2004 | Bronnimann et al. | |
| 2004/0093327 A1 | 5/2004 | Anderson et al. | |
| 2004/0267612 A1 * | 12/2004 | Veach | 705/14 |
| 2004/0267725 A1 * | 12/2004 | Harik | 707/3 |
| 2004/0267806 A1 | 12/2004 | Lester | |
| 2005/0038717 A1 | 2/2005 | McQueen, III et al. | |
| 2005/0065811 A1 * | 3/2005 | Chu et al. | 705/1 |
| 2005/0076297 A1 | 4/2005 | Tanaka et al. | |

(Continued)

OTHER PUBLICATIONS

Wells, William. "Recognition, Recall, and Rating Scales.(measuring the sales effects of advertisements)" Journal of Advertising Research, Nov. 2000.*

(Continued)

*Primary Examiner* — Michelle Tarae
(74) *Attorney, Agent, or Firm* — Knobbe, Martens, Olson & Bear LLP

(57) ABSTRACT

An ad placement system provides functionality for users to rate advertisers associated with particular ads they view, and/or to rate particular ads. The ratings supplied by individual users in association with a given advertiser are used by the system to generate an average or other aggregate rating for the advertiser. This aggregate rating is exposed to users in association with the advertiser's ad or ads, allowing users to efficiently take the advertiser's reputation into consideration in deciding whether to click through or otherwise select such ads to access the advertiser's web page or site. For example, in one embodiment, each ad is displayed with a corresponding visual indication of the aggregate rating of the advertiser.

18 Claims, 6 Drawing Sheets

U.S. PATENT DOCUMENTS

2005/0096979 A1    5/2005   Koningstein
2005/0114198 A1*   5/2005   Koningstein et al. ........... 705/10
2005/0223002 A1   10/2005   Agarwal et al.
2007/0038508 A1    2/2007   Jain et al.
2007/0050251 A1    3/2007   Jain et al.

OTHER PUBLICATIONS

Lohtia, Ritu et al. "The impact of content and design elements on banner advertising click-through rates." Journal of Advertising Research, Dec. 2003.*

"Google offers smart pricing for AdWords," New Media Age, Apr. 15, 2004.*

Hoffman et al. "Advertising Pricing Models for the World Wide Web," Internet Publishing and Beyond: The Economics of Digital Information and Intellectual Property, 2000.*

Kautz, K., Selman, B., and Shah, M., "Referral Web: Combining Social Networks and Collaborative Filtering," Communications of the ACM, Mar. 1997, vol. 40, No. 3, pp. 63-65.

Office Action mailed on Jul. 22, 2008 in U.S. Appl. No. 11/295,171.
Office Action mailed on Jan. 27, 2009 in U.S. Appl. No. 11/295,171.
Office Action mailed on Sep. 16, 2009 in U.S. Appl. No. 11/295,171.

* cited by examiner

INTERNET ADVERTISING SYSTEM THAT PROVIDES RATINGS-BASED INCENTIVES TO ADVERTISERS

CROSS-REFERENCE TO RELATED APPLICATIONS

This application claims the benefit of U.S. Provisional Application No. 60/646,109, filed Jan. 21, 2005, the disclosure of which is hereby incorporated by reference.

BACKGROUND OF THE INVENTION

1. Field of the Invention

The present invention relates to systems and methods for serving advertisements and related content to users in a distributed, content-based system.

2. Description of the Related Art

Various types of ad placement systems exist for displaying targeted advertisements on web pages. One type of system allows business entities (advertisers) to associate their respective ads with specific keywords, which may include phrases. When a user submits a search query to an Internet search engine, the ad or ads associated with the keyword or keywords entered by the user are displayed on the resulting search results page—typically under a heading such as "sponsored links" or "sponsored results." The display position of each such ad relative to other ads, and the amount paid by the corresponding advertiser if the ad is clicked on by a user, is typically dictated by a keyword bid amount specified by the advertiser. Typically, the ads of each advertiser are displayed on a variety of different independent web sites through a process known generally as syndication.

Another type of ad placement system operates by selecting ads to display on relatively static web pages by performing content-based analyses of such pages. For example, Google's AdSense program allows web site operators to configure selected pages of their respective web sites to display or "host" ads served by a remote ad server. To select appropriate ads to display on a given page, a crawler program is typically used to analyze the textual content of the page, and to attempt to match the page's content to relevant ads.

Online advertising has seen tremendous growth, and is now a multi-billion dollar industry. An online ad typically is linked to a web site that provides products or services for purchase. Many online businesses are reputable and provide excellent service and support. Others, however, may provide less than desirable results. Given the large number of online advertisers, it is often difficult for a user to know if an advertiser is reputable.

SUMMARY

An ad placement system is disclosed that provides functionality for users to rate advertisers associated with particular ads they view, and/or to rate particular ads. The ratings supplied by individual users are used by the system to generate an aggregate user rating, such as an average rating, for the advertiser and/or ad. This aggregate rating may be exposed to users in association with the advertiser's ad or ads, allowing users to efficiently take the advertiser's reputation into consideration in deciding whether to click through or otherwise select such ads to access the advertiser's web page or site.

For example, in one embodiment, each ad is displayed with a corresponding graphical or textual rating indicator (e.g., on a scale of one to five stars) which indicates of the average rating of the advertiser. This rating indicator may, for example, be selectable by the user (separately from the ad as a whole) to obtain additional information about the advertiser, and/or to rate the advertiser. The information about the advertiser may, for example, include ratings and textual reviews submitted by individual users. In another embodiment, the ads are displayed without the rating indicators, but are displayed with one or more display elements (one for each ad, or one for all ads displayed on the page) that can be selected to view the ratings of the corresponding advertiser(s).

The ad placement system may implement any one or more of the following methods, as well as other methods, for assisting users in rating individual advertisers and/or ads: (a) the user can click on the rating indicator for a given ad to access an advertiser information page that includes, or provides a link to, a form for rating the advertiser and/or ad; (b) the user can hover the mouse pointer over the rating indicator, or another graphical element or portion of the ad, to cause an overlay display object to be generated which includes, or provides a link to, a rating form, such that the user can efficiently rate the advertiser and/or ad without navigating away from the page on which the ad is displayed, (c) the ad placement system or a browser toolbar maintains an ad selection history for the user, and provides a history display from which the user can select a particular advertiser and/or ad to rate; (d) the ad placement system keeps track of the ad (or the corresponding advertiser) most recently selected by each user (such as by storing this information in a cache, or in a cookie written to the user's computer); when one or more ads are subsequently served to a given user on a web page, the web page is supplemented with a message prompting the user to rate the advertiser associated with the most-recently selected ad (and/or to rate the ad itself), and with a link to a form for supplying this rating.

The ratings data collected by the system may also be used for other purposes. For example, the ad placement system may take an advertiser's or ad's aggregate rating into consideration in determining whether to display the ad on a given web page, and/or in selecting a display slot for this ad. In addition, the fee charged to the advertiser for an ad selection event may depend on this average rating, such that a discount is applied to highly rated advertisers and/or ads. Further, each user may be given the option to specify a minimum average rating, or some other ratings-based criteria, for controlling the types of ads that are displayed to that user. Similarly, an operator of an ad publishing web site may be permitted to specify a minimum average rating, or other ratings-based criteria, for controlling the types of ads displayed on web pages of its web site.

This summary and the following detailed description are directed to specific embodiments of the invention. The invention is not limited to these particular embodiments, but rather is defined by the claims.

DETAILED DESCRIPTION OF THE SPECIFIC EMBODIMENTS

Specific embodiments of the invention will now be described with reference to the drawings. As will be recognized, the invention is not limited to these particular embodiments.

I. OVERVIEW (FIG. 1)

Figure 1:
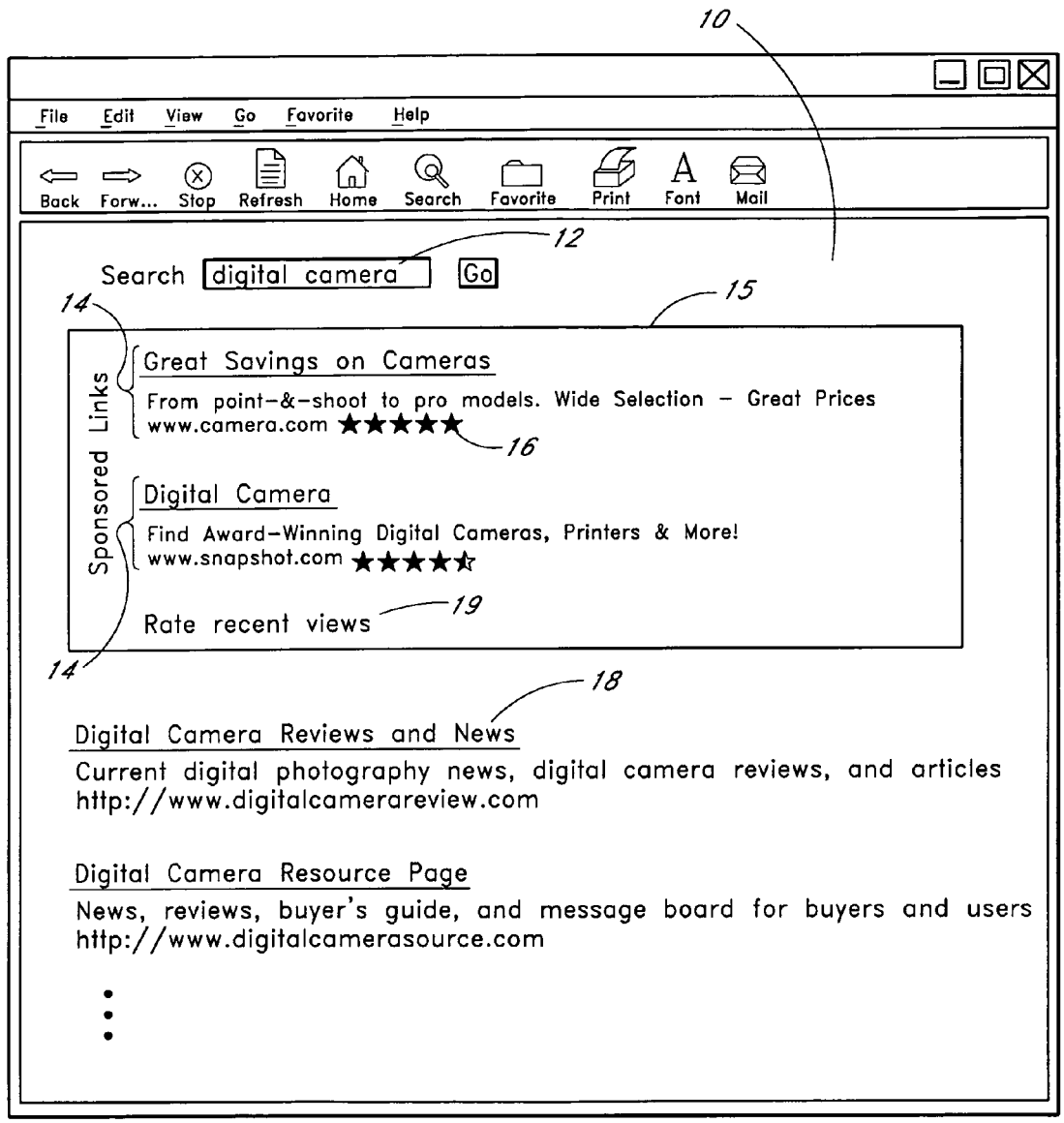
FIG. 1 illustrates a web browser displaying ads together with other web page content.

FIG. 1 illustrates one example of a web page 10 generated according to one embodiment of the invention, as displayed by a web browser. The web page 10 displays a listing of search results 18 that correspond to a query 12 submitted by a user. The search results 18 are displayed along with corresponding advertisements 14 (also referred to as "sponsored links"). As is conventional, each ad is selectable by the user to cause the web browser to load a web page of a web site of the corresponding advertiser.

In the particular example shown in FIG. 1, the web page 10 is a search results page generated by an Internet search engine site, and the particular ads or sponsored links 14 that are displayed have been selected based on the query entered by the user. As will be apparent, the invention is also applicable to the display of ads on non-search-results web pages; for example, the invention may be implemented in connection with ads that are matched to static or relatively static web pages based on an automated content-based analysis of such web pages. It will also be recognized that the invention may be implemented in the context of advertisements other than sponsored links.

As illustrated in FIG. 1, each ad 14 is displayed together with a rating indicator 16 that specifies an average or other aggregate rating of or associated with the corresponding advertiser. (As discussed below, the rating indicators 16 may alternatively be omitted from the web page 10 but made accessible via one or more selectable display elements on the web page 10.) This example shows a rating scale from zero to five, with the rating being represented as stars and representing an average rating of the advertiser. The ratings provide the user with an indication of how other users have rated the particular advertiser (and/or particular ads of this advertiser), and allow the user to take the advertisers' reputations into consideration in determining whether to click on particular sponsored links 14. As discussed below, the advertiser ratings data is collected and made available by an ad placement system operated by an ad placement service provider.

Figure 2A:
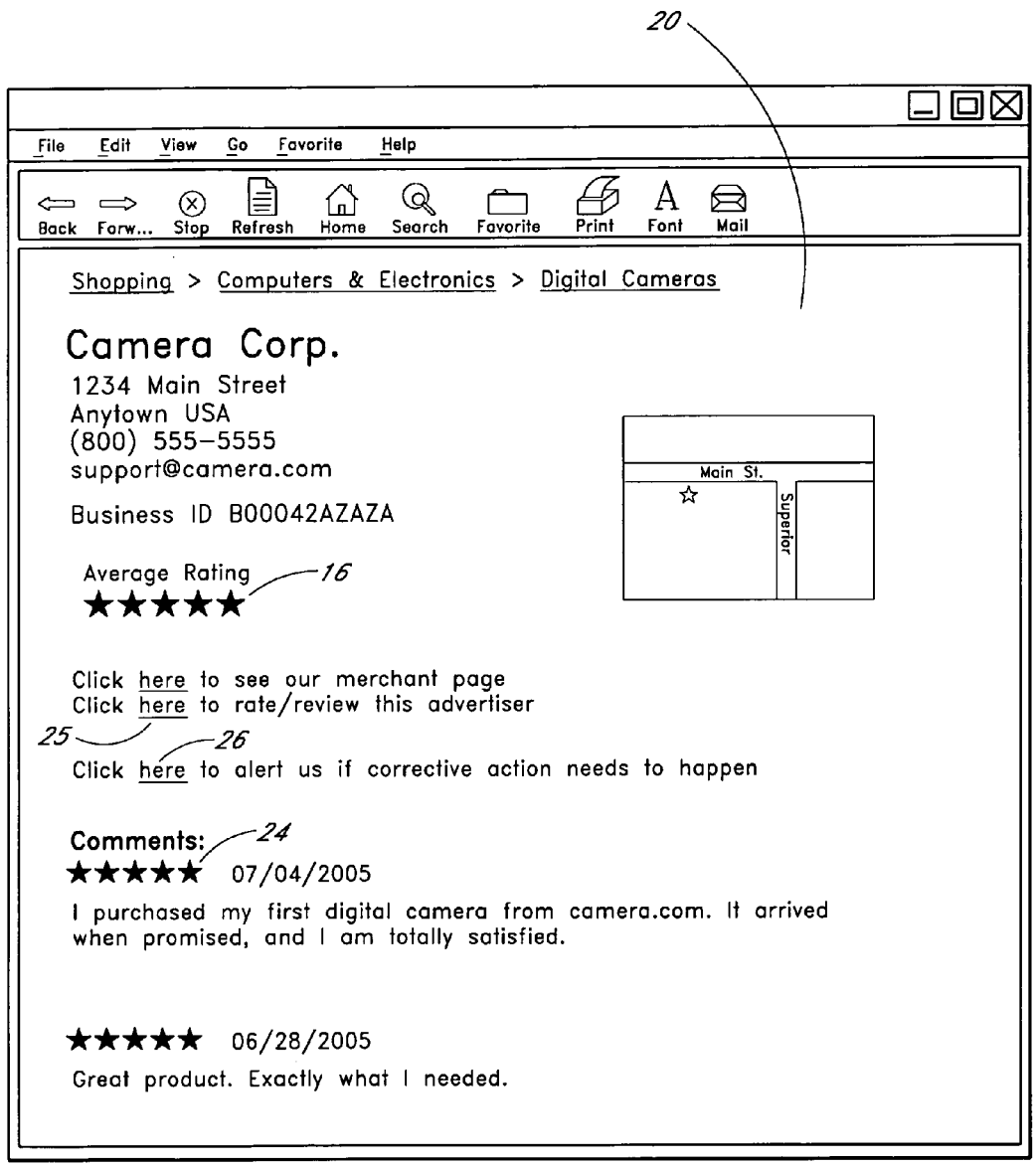
FIG. 2A illustrates a web browser displaying rating/review information about an advertiser.

In the illustrated embodiment, clicking the rating indicator 16 associated with a particular sponsored link 14 causes the user's web browser to display a corresponding advertiser information web page that provides more information about the corresponding advertiser, as maintained by the ad placement system. FIG. 2A illustrates one example of such an advertiser information page 20. Some of the information on this web page 20, such as contact information, may be provided by the advertiser. Other content on the web page, such as the specific ratings and textual reviews, are supplied by individual users as described below. The ad placement system may host separate advertiser information pages 20 for some or all of the advertisers that have set up advertising campaigns via the system.

While viewing the advertiser information web page 20 of FIG. 2A, the user can select a corresponding link 25 to access a separate web page (FIG. 3) that includes a form for rating the advertiser. Although the users rate particular advertisers in the illustrated embodiment, in other embodiments the users may additionally or alternatively rate particular ads or ad campaigns. The form shown in FIG. 3 may alternatively be provided on the advertiser information page 20, or, as described below, may be presented in an "overlay display object" as part of the original search results page 10.

Figure 3:
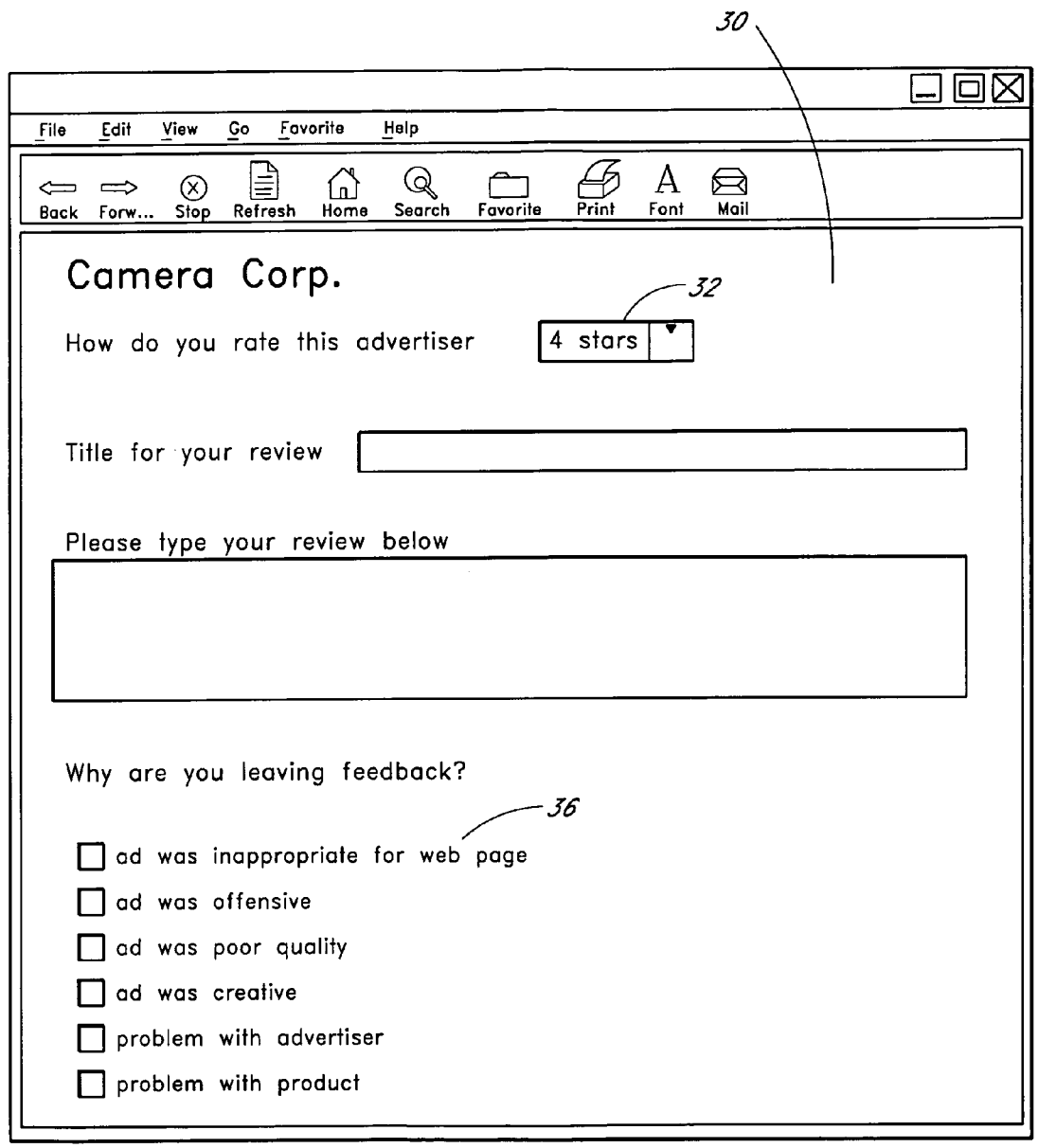
FIG. 3 illustrates a web-based interface that allows a user to rate/review an advertiser.

In the example shown in FIG. 3, the user can provide an overall rating 32 on a scale of 1 to 5 stars, and can enter a textual review of the advertiser. The web form shown in FIG. 3 also includes a set of checkboxes 36 for allowing the user to provide a reason for leaving feedback 36, such as the ad being inappropriate for the web page, the ad being offensive, the ad being of poor quality, the ad being creative, problems with the advertiser, and/or problems with a product. Although not depicted in this example, users may, in some embodiments, be required to log into their respective accounts with the ad placement provider before they are permitted to rate an advertiser, or before they are permitted to submit a textual review.

Figure 2B:
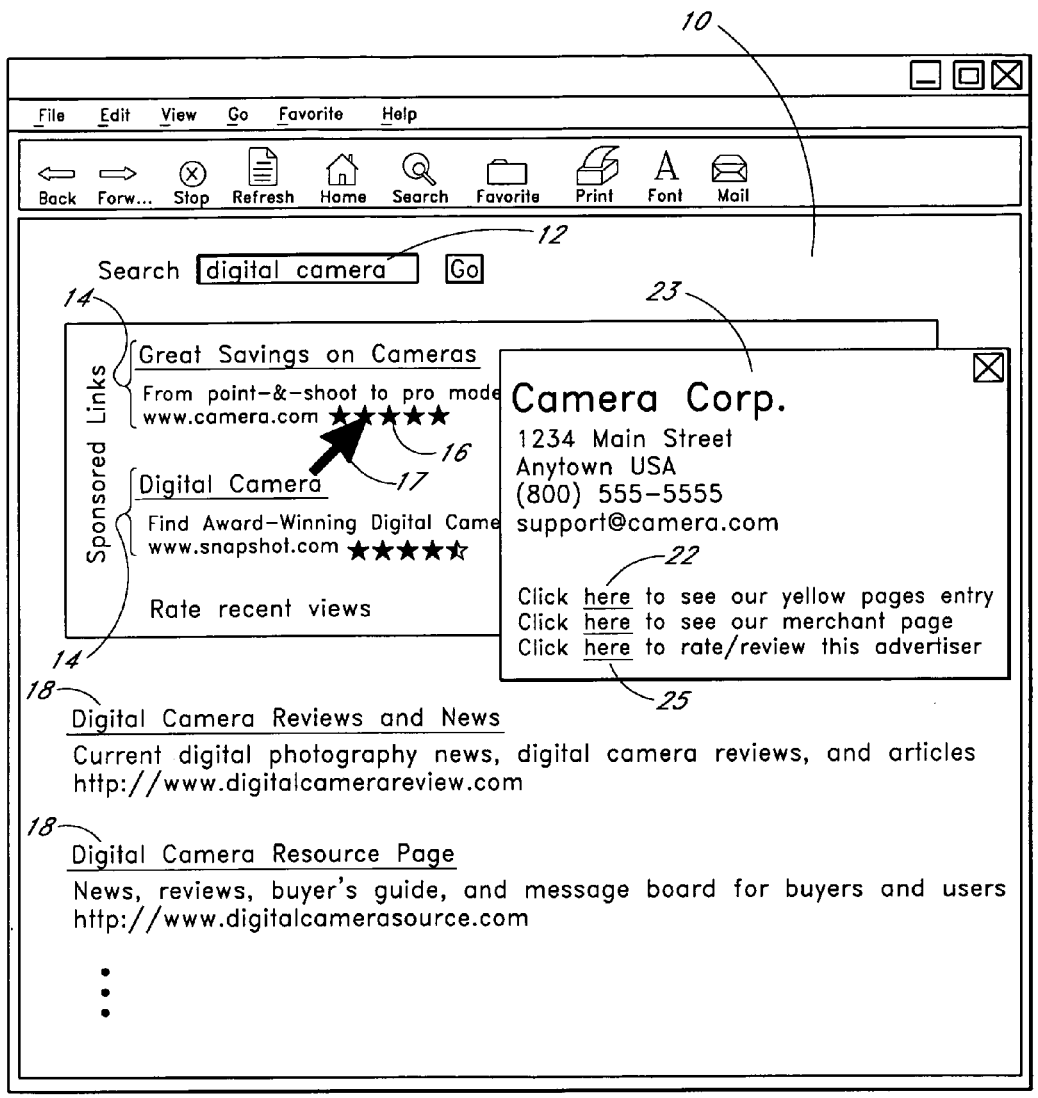
FIG. 2B illustrates a web browser displaying rating/review information about an advertiser using an overlay display object.

With reference to FIG. 2B, the ad placement system may additionally or alternatively provide functionality for the user to access some or all of the advertiser information, and/or rate the advertiser, without navigating away from the search results page 10. For example, in the embodiment depicted in FIG. 2B, the user can hover the mouse pointer 17 over a rating indicator 16 to cause the corresponding advertiser information to be displayed in an overlay display object 23 or "pop-over" that is part of the web page 10. Movement of the mouse pointer away from the rating indicator causes this overlay display object to disappear from view. The overlay display objects may be generated via embedded JavaScript code as described in U.S. patent application Ser. No. 11/182,517, filed Jul. 15, 2005, the disclosure of which is hereby incorporated by reference. The content that is displayed in a given overlay display object 23 may be embedded in the originally-served web page 10 as hidden content, or may be requested by the web browser/user computer in response to the mouse-over event. This content may include links, buttons, and other types of active elements that are selectable to cause the overlay display object 23 to be updated with new content. The overlay display object thus serves as a mini-browser than can be used to access and submit information about the advertiser during viewing of the original web page 10 on which the ad is displayed In the particular embodiment illustrated in FIG. 2B, the overlay display object 23 initially displays a "rate/review this advertiser" link 25. If the user selects this link, the overlay display object 23 effectively loads and displays an advertiser rating form (not shown), which may be similar to, or a scaled down version of, the web form shown in FIG. 3. Using this advertiser rating form, the user can rate the advertiser without navigating away from the search results page 10, and thus without losing the context associated with the search. Although the user must click through to the advertiser rating form in the example shown in FIG. 2B, the rating form may alternatively be displayed immediately in response to a mouse-over of the rating indicator 16, or immediately in response to a mouse-over of a separate display element that may be provided specifically for rating advertisers.

To increase the likelihood that users will rate the advertisers corresponding to the ads they have selected, the ad placement system may optionally keep track of the ads selected by particular users, and use this "ad selection history" information to assist users in rating corresponding advertisers. FIG. 1 illustrates one example of how this feature may be implemented. In this example, the "sponsored links" section 15 of the search results page 10 includes a "recent views" link 19 for accessing a personal history (not shown) of recent ad selection events. From this history (which may be displayed on a separate web page or in an overlay display object), the user can select a particular advertiser to rate, and then proceed with rating the advertiser as described above. In another embodiment (not shown), if a user selects (clicks through) a sponsored link 14 associated with a particular advertiser, and thereafter returns to the search engine web site and submits a new search query, the search results page for the new query is automatically personalized with a message/link that prompts the user to rate this particular advertiser.

In the example shown in FIG. 2A, the advertiser information is part of a business directory (e.g., online yellow pages). Alternatively, the advertiser information page may include a link to a corresponding page in a business directory. In one embodiment of the ad placement system, the advertiser information pages may also be accessed by searching the business directory. This allows a user that desires to rate a particular advertiser easy access to the advertiser's page. As shown in FIGS. 2A and 2B, a link 25 provides access to the rating/review page for the advertiser. Alternatively, the fields for providing a rating or review could be included as part of the advertiser's main page in the business directory. In one embodiment, the rating and/or review fields would only be shown to users that have recently viewed an advertisement that corresponds to the advertiser. Of course, the business directory may also include listings for businesses that do not advertise through sponsored links.

The average user ratings 16 shown in FIGS. 2A and 2B are calculated automatically by the ad placement system, and are typically based on the individual ratings supplied by many different users. In some embodiments, this average rating may be calculated such that the ratings supplied by some users are given more weight than the ratings provided by others. For instance, more weight may be given to a rating supplied by a user who is recognized or who takes the time to log in. Conversely, a user that does not log in may not be allowed to rate or review an advertiser, or the rating may be given no weight. Historical information about the user may also be taken into consideration. For instance, greater weight may be applied if the user supplying the rating has a significant transaction history with the ad placement provider and/or related entities. The average ratings may also be generated such that more weight is generally given to recent rating submissions than to older rating submissions. For new advertisers, the display of the average rating may be inhibited until a sufficient number of users have rated the advertiser.

Generally, a user providing feedback does not expect a response or any action to be taken by the entity receiving the feedback. There are situations, however, where a response or corrective action may be needed. For example, a user may wish to alert the ad placement provider and/or other users about an advertiser that is engaging in fraudulent, deceptive or immoral behavior. Thus, as illustrated in FIG. 2A, an alert button or link 26 may be provided on each advertiser information page 20 to allow a user to complain, for example, about content or actions of an advertiser.

The web pages illustrated in FIGS. 1-3 are merely exemplary of particular user interface features that may be provided for creating and reviewing advertiser ratings and reviews. Numerous other options are possible. For instance, the web page 10 that displays the ads may include JavaScript code that is responsive to a particular type of event, such as a mouse-over event performed with respect to a particular ad or portion of that ad, by causing the ad to expand in size so as to reveal the corresponding advertiser information and/or a corresponding advertiser rating form.

Further, as mentioned above, in some embodiments the users may rate individual ads, in addition or as an alternative to rating individual advertisers. Where individual ads are rated, the ad-specific ratings may be used both to generate an average rating for a particular ad and an average rating for the corresponding advertiser. Further, for ads that advertise a particular benefit such as "10% off" or "free shipping," users may be able to rate the ad or advertiser based on the benefit actually provided, as described in U.S. Provisional Application No. 60/646,109, filed Jan. 21, 2005, the disclosure of which is hereby incorporated by reference.

II. EXAMPLE SYSTEM COMPONENTS

Figure 4:
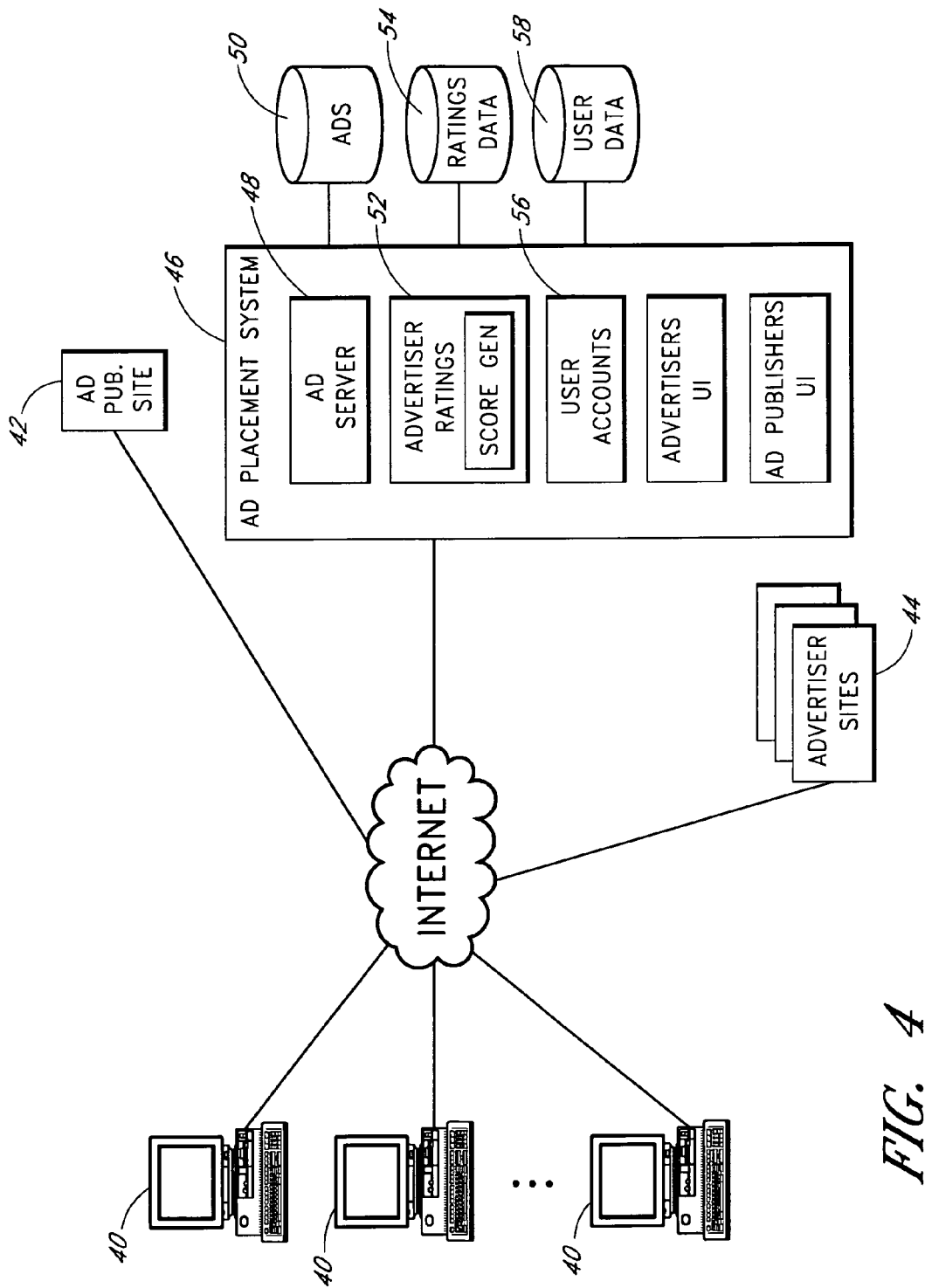
FIG. 4 illustrates an overview of communications between a user computer, an ad publishing site, an ad placement system, and advertiser sites.

FIG. 4 provides an overview of the components that participate in ad placement and selection transactions in accordance with one embodiment of the invention. The components shown in FIG. 4 include a user computer 40, an ad publishing web site 42, an advertiser web site 44 and an ad placement system 46. The ad placement system 46 provides functionality for collecting "sponsored link" type ads from advertisers, serving these ads for display on web pages, and charging advertisers for resulting ad selection events. The primary entity that operates the ad placement system is referred to herein as the "ad placement provider." The ad placement system 46 also includes functionality for collecting and serving advertiser ratings and reviews, as described above.

The ad publishing site 42 may be one of many web sites that host or "publish" ads served by the ad placement system 46 through a business relationship with the ad placement provider. An entity that operates an ad publishing site 42 is referred to herein as an "ad publisher." The ad placement provider may itself serve as an ad publisher by including ads in its own web pages.

In the embodiment shown in FIG. 4, the ad placement system 46 includes an ad server 48 with an accompanying ad repository 50, an advertiser ratings server 52 with an accompanying ratings data repository 54, and a user accounts module 56 with an accompanying user data repository 58. The advertiser ratings server 52 includes a score generation module responsible for generating the average user ratings for particular advertisers. The ad placement system 46 also includes an advertisers UI 60 that provides functionality for advertisers to create, modify and monitor the performance of ad campaigns. In addition, the ad placement system includes an ad publishers UI 62 through which third party web site operators can register to host ads on their respective web sites. The ad publishers UI may, in some embodiments, provide an option for an ad publisher to specify a minimum average rating, or other ratings-based criteria, for controlling the ads that are displayed on its web pages.

Although not illustrated in FIG. 4, the ad placement system 46 may also include, or may access, an online business directory or "yellow pages" service that stores and serves information about particular businesses. In one embodiment, when a business initially enrolls as an advertiser, the ad placement system 46 assigns a unique identifier to the business, and creates a corresponding advertiser/business information page (which may be similar to the page shown in FIG. 2A). The content of this page may evolve over time as information about the advertiser, including user ratings and reviews, is collected from various sources. The online business directory/yellow pages may also include listings for businesses that do not advertise via the ad placement system.

In one embodiment, the ad server 48 transmits the ads directly to the user computers 40 for display on web pages loaded on such computers. In another embodiment, the ad publishing site 42 retrieves the ads from the ad server 48 in response to page requests from user computers 40, and incorporates these ads into the requested web pages.

With further reference to FIG. 4, the advertiser web site 44 is a web site of an entity (referred to as the "advertiser") that advertises on one or more ad publishing sites 42 via the ad placement system 46. As is known in the art, the advertiser may create one or more ads, and may specify one or more criteria for controlling how these ads are selected for display. For example, the advertiser may associate a given ad with one or more keywords that are used by the ad server 48 to select ads for display. Each such ad typically includes a link that can be clicked on to access the corresponding advertiser site 44.

The ad server 48, ad publishing site 42, and advertiser site 44 may each be implemented by one or more physical servers. The user computers 40 may be any type of computing device (PC, Personal Digital Assistant, television set-top box, mobile phone, etc.) capable of retrieving and displaying web pages or other types of hypertext content. Communication between the components shown in FIG. 4 may occur over the Internet and/or any other type of computer network.

As depicted in FIG. 4, the ad placement system 46 may access a repository of user data 58, including user account data. The user data stored in the repository 58 may, in some embodiments, be collected as the result of other online operations of the ad placement provider and/or its affiliates. For example, the ad placement provider may operate one or more web sites for providing services (sales, rentals, subscription-based content, etc.) to web users, or for conducting other types of operations that involve the collection of user data. The types of user data that are collected and stored by the ad placement provider may vary widely depending upon the type or types of online transactions conducted. For example, in the context of online sales and rentals of items, the user data stored for a given user will typically include a username and password, an email address, a shipping address, credit card or other payment information, and a history of transactions conducted.

Although identification of a user is not required, user data may be useful in preventing abuse of advertiser ratings. Some entities may give poor ratings to their competitors, while other entities may give high ratings to their own affiliates. Abuse by an anonymous user may be more difficult to deter than abuse by a known user. Requiring a user to provide a name or to login before rating an advertiser discourages embellished ratings, and assists in detecting abuse. As described above, the data maintained for a given user may also be taken into consideration in determining how much (if any) weight to accord to a rating supplied by that user for purposes of calculating the average ratings.

Because the comments/review section of the advertiser ratings form invites mischief, in one embodiment a user is required to login prior to submitting a textual review, thereby reducing malicious or inappropriate reviews. As an additional security measure, a user may be required to have specific identification information on file, such as a credit card, in order to submit a review.

The high-level overview illustrated in FIG. 4 partitions the functionality of the overall system into modules for ease of explanation. It is to be understood, however, that one or more modules may operate as a single unit. Conversely, a single module may comprise one or more subcomponents that are distributed throughout one or more locations. Further, the communication between the modules may occur in a variety of ways, such as hardware implementations (e.g., over a network, serial interface, parallel interface, or internal bus), software implementations (e.g., database, DDE, passing variables), or a combination of hardware and software. For example, the ad server 48 may comprise multiple servers that operate independently from the advertiser ratings server 52.

III. USE OF THE RATINGS IN ADVERTISEMENT SELECTION

The selection by the ad server 48 of a particular ad for display, and its position relative to other ads on the page 10, may be based on a variety of factors, such as the search term(s) submitted by the user (in the case of a search request), content of a web page requested by a user, the click-through rates of particular ads, and the bid amounts (if bidding is used) associated with particular ads. The ratings of an ad or advertiser can also be used as a factor in the selection of ad placements, such that advertisers are rewarded for high ratings by improved placement of their ads. For example, whenever ads from multiple advertisers are selected for concurrent display on a web page, the ads may automatically be ordered from highest to lowest advertiser rating, such that the ads associated with the highest ratings are displayed in the most prominent positions. The factors considered in selecting an ad for display may be weighted, with the final ad selection being based on an accumulation of those weighted factors. The task of selecting ads for display, and determining their relative display positions or rankings, may be performed dynamically by the ad server 48.

The overall rating of an advertiser provides a factor that is independent of individual users. Advertisers that consistently receive low ratings may have their ads shown less frequently and/or in less desirable display positions, or may even have their ads pulled from circulation. Similarly, advertisers that receive high ratings may have their ads circulated more frequently and/or in more prominent display positions.

The ad selection process may, in some embodiments, also be personalized based on the ratings supplied by the individual user. For example, a user that gives an advertiser or its ad(s) a low rating is generally not likely to be interested in future ads from that advertiser. Accordingly, if the rating is sufficiently low, the ad placement system 46 may refrain from serving ads from that advertiser to this particular user for some period of time. If a user re-rates an advertiser, the new rating may replace the old one. In one embodiment, the user may block future ads from a designated advertiser. The user may, however, be required to indicate one or more reasons for the low rating before future ads are blocked.

In some embodiments, users may also be given the option to specify one or more criteria, such as a minimum advertiser or ad rating, for purposes of controlling the ads they see. Where such preference information is supplied, the ad placement system 46 may use a browser cookie received with a user's page request to look up the user's preferences, and may then apply these preferences for purposes of selecting ads to display on the web page. The user's preferences may alternatively be encoded within the browser cookie.

IV. RATINGS-BASED INCENTIVES

Another application for the ratings data collected by the ad placement system 46 is to give advertisers discounts, and/or other incentives, that depend upon their average or other aggregate ratings. For example, an advertiser that has a high rating may qualify for a discount, while an advertiser with a low rating may not. Thus, advertisers that tend to provide high quality ads and service are given an incentive to advertise via the ad placement system 46. As another example, an advertiser that has a highly-rated ad may be given a discount that is specific to that ad or ad campaign.

The discount provided to an advertiser may be tied to the overall rating for the advertiser, and/or to a rating for a particular ad or ad campaign. The ad placement system 46 may apply the discounts automatically for purposes of charging the advertisers. For example, if a cost-per-click model is used and a particular advertiser is entitled to a 5% discount, the ad placement system may automatically give the advertiser a 5% discount (i.e., reduce the cost-per-click fee by 5%) on all cost-per-click transactions that occur during the discount period. Similarly, if a cost-per-call model is used in which the advertiser is charged only if the user places a call to the advertiser (e.g., by clicking on an ad display element for initiating a voice-over-IP call), the discount may automatically be applied to the cost-per-call transaction fee.

The discount may be set based on previous ratings, so that an advertiser knows in advance the amount of discount to expect. For example, when an advertiser creates a new ad campaign, the discount (if any) to be used throughout that campaign may be determined based on the advertiser's rating at that time. Alternatively, the discount may be based on an accumulation of ratings received during the running of an ad campaign, so that the discount for that campaign corresponds to the quality of the campaign; for instance, the discount applied to the pay-per-click fee for a given ad-selection event may be determined based on the advertiser's (or campaign's) aggregate rating at the time of the event. In any of the embodiments, a minimum quantity of ratings data may be required before the advertiser is entitled to a discount. For example, an advertiser (or ad campaign) may not qualify for a discount until ratings have been received from some number, such as one fifty or one hundred, of unique users.

Multiple discount tiers may be provided, with the amount of the discount being generally proportional to the advertiser's overall rating. For example, advertisers with a rating of 4.0 to 4.25 stars may be given a 2% discount, advertisers with a rating of 4.25+ to 4.5 stars may be given a 5% discount, and advertisers with ratings above 4.5 stars may be given a 10% discount.

The discount could be based on other factors as well, such as the click-through rate for the advertiser or for a particular advertisement. For example, the ad placement system could calculate the discount for a given ad as a function of both the advertiser's overall rating and the ad's click-through rate, with higher ratings and click-through rates tending to produce higher discounts. With this approach advertisers are rewarded based on both the quality of their ads and on the quality of the services they provide.

Various other types of ratings-based incentives may additionally or alternatively be provided to the advertisers. For example, advertisers with high ratings may automatically be given a certain number of free click-through transactions per unit time. As another example, when a user conducts a keyword search of the online business directory/yellow pages (if one is provided), the listings of businesses/advertisers with the highest overall ratings may automatically be displayed at the top of, and/or more prominently on, the search results page. Further, the ratings associated with particular advertisers may be taken into consideration for ad ranking purposes, such that ads associated with high aggregate ratings tend to be displayed more prominently (e.g., in a higher display slot on the page) than ads associated with lower aggregate ratings.

As with advertiser ratings, the discount for an advertiser may be considered in the ad selection process.

V. EXAMPLE AD-SERVING PROCESS FLOW

Figure 5:
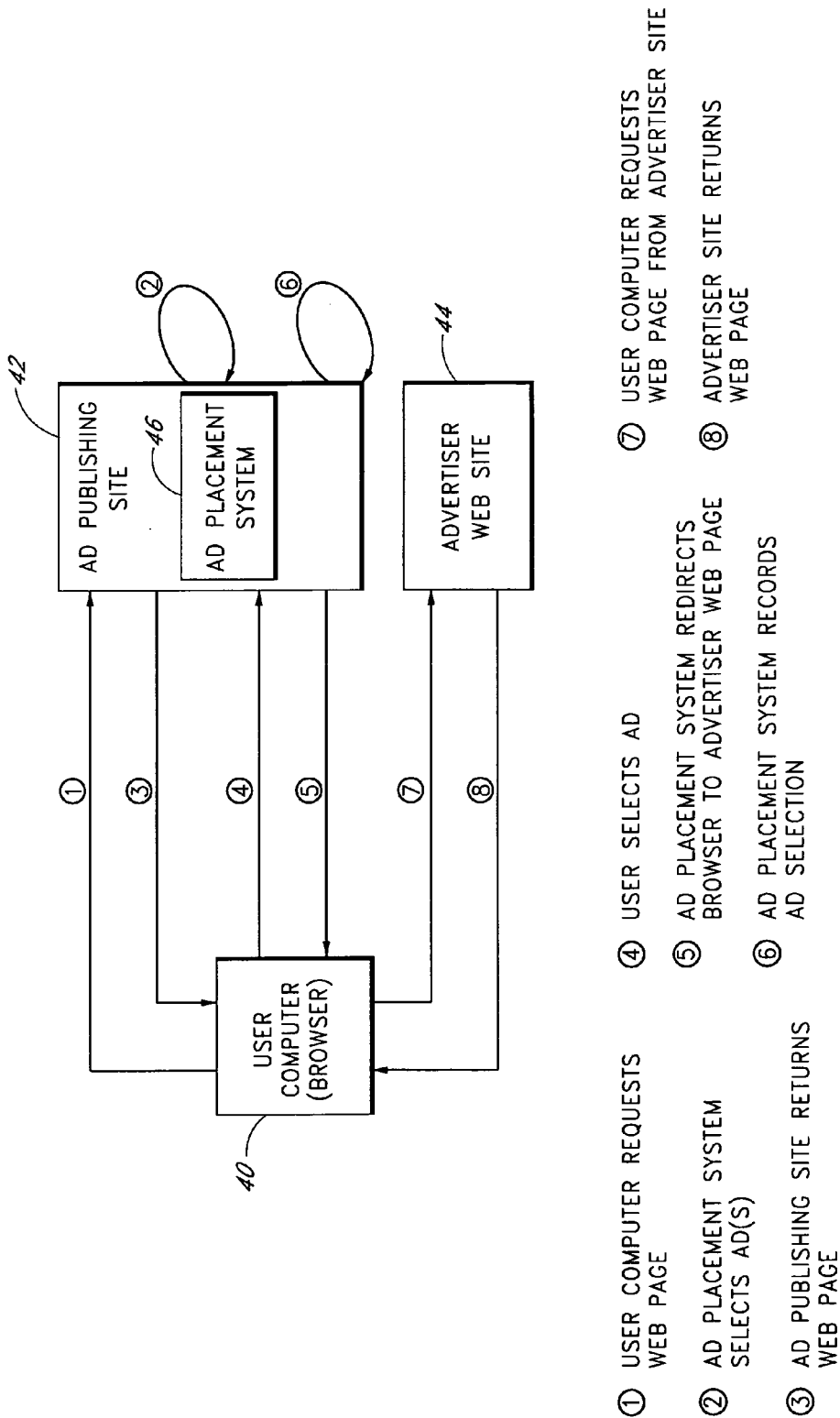
FIG. 5 illustrates an overview of the flow of information between a user computer, an ad-placement system, and an advertiser site.

FIG. 5 illustrates a sequence of interactions between a user computer 40, an ad publishing site 42, and an advertiser web site 44 according to one embodiment of the invention. In this particular embodiment, some or all of the functionality of the ad placement system 46 is implemented as part of the ad publishing site 42. In other use cases, the ad placement system 46 may be physically separate from the ad publishing site 42. Although the events shown in FIG. 5 are numbered sequentially for purposes of explanation, as will be apparent, the events do not necessarily need to be performed in the listed order.

In Event 1, the web browser running on the user computer 40 sends a page request to the ad publishing site 42. The page request may, for example, be an HTTP GET URL request, or may be an HTTP POST request used to submit a search query or other information supplied by the user. If a cookie corresponding to the ad publishing site 42 is stored on the user computer, this cookie will ordinarily be transmitted with the page request.

In Event 2, the ad placement system 46 selects one or more appropriate ads, incorporates the average rating indicators 16 into the content of these ads, and supplements the requested page with these ads. The ad or ads selected in Event 2 may depend upon the page request information, if any, passed to the ad placement system 46. For example, if the page request is in the form of a search query submission, the ad placement system 46 may select one or more ads associated with any keywords included in the search query. If the page request is a request for a relatively static web page, the ad or ads may be selected based on the content of this web page as previously analyzed by a crawling program. As explained previously, the selection of the ad may take into consideration factors such as the overall rating of an advertiser and/or a rating of the advertiser by the identified user.

In Event 3, the ad publishing site 42 responds to the page request with the web page, as supplemented with the selected ad or ads. As depicted in FIG. 1 and discussed above, each ad may include, or be displayed in conjunction with, a visual indication 16 of the average rating of the corresponding advertiser. In embodiments that use overlay display objects, the web page may include embedded JavaScript code, or code written in another language, which provides functionality for generating overlay display objects in response to mouse-over events.

In Event 4, the user selects the ad, such as by clicking on a link included in the ad, causing the web browser/user computer 40 to send a request to the ad placement system 46. This request may include an identifier of the advertisement, which may be used to look up the corresponding target URL of the advertiser web site. The target URL may alternatively be included in the request message itself. If the user computer has previously accessed registered with the ad placement system 46, the request transmitted in Event 4 may include a cookie associated with the ad placement system.

In Event 5, the ad placement system 46 responds by redirecting the user's web browser to the advertiser site 44. In Event 6, the ad placement system 46 logs the request (including any cookie received with the request). This logged information may be used, as described above, to subsequently prompt the user to supply a rating of the corresponding advertiser or ad. In Events 7 and 8, the browser responds to the redirect command by retrieving a web page from the advertiser site 44. In other embodiments, the ad may point directly to the advertiser site such that a redirect is not necessary; in such embodiments, the web page may, for example, include JavaScript code that causes the browser to notify the ad placement system 46 of the ad selection event.

Referring again to FIG. 5, in some cases, the advertiser may not actually operate its own web site, but may instead offer goods or services on a web site operated by the ad placement provider. In such a scenario, the user's web browser may, instead of being redirected to an advertiser site 44, be redirected to an advertiser-specific web page hosted by the ad publishing web site 42. The process may otherwise be the same as in FIG. 5.

VI. IMPLEMENTATION VARIATIONS

Various modifications and additions to the ad placement system 46 are possible. For example, users of the system may be provided an option to install a browser toolbar (plug-in) that maintains a history of ads selected by the user over time. When a user desires to rate an advertiser, the user can select the corresponding ad or advertiser from this history, as displayed by the toolbar. The toolbar may be designed to interact with the ad placement system 46 for purposes of implementing this feature. The toolbar is generally unobtrusive, and does not obscure content on web pages when it is not being used.

In another embodiment, information about the users' most recent ad selection is kept in a cache on the ad placement system 46. When a user accesses a web page that displays one or more ads, this web page may be supplemented with a request, and an associated rating link, to rate the advertiser associated with the most recently selected ad (and/or to rate the ad itself), as represented in the cache. After this rating link has been shown to the user a specified number of times (which may be one), or after a specified amount of time has elapsed (e.g., 48 hours), the ad selection event may be deleted from the cache. Rather than recording a user's recent ad selections in a cache on a server, this information may be stored in a cookie on the user's computer.

As will be recognized, various ratings schemes may be used in place of, or in combination with, the five star rating scheme used in the above examples. For example, in a more complex embodiment, a user may address multiple aspects of the advertiser and/or advertisements. Advertisements for a particular advertiser may be clustered into groups that correspond with various advertisement campaigns, allowing a user to rate an advertisement campaign instead of or together with rating an advertiser. Further, a user may be provided an option to supply separate ratings for each of the following: ad's creativity, correspondence of ad placement to the web page where it appeared, and/or satisfaction with the advertiser.

The embodiment illustrated in FIG. 1 shows a rating indicator 16 for each advertiser. However, there may be advertisers for which ratings do not exist or are not shown. For example, ratings may not be shown for an advertiser that does not have a threshold number of user ratings.

Some advertisers may not wish to have user ranking or feedback information provided about them. Accordingly, a website may provide a "Gold Seal" of approval instead of a rating for those advertisers. A user may still be able to leave feedback about an advertiser, even if the comments and ratings are not published. This may be helpful to determine whether a seal of approval should be revoked.

Displaying a rating indicator 16 together with an advertisement is likely to affect the user's decision to click on the advertisement. Instead of displaying a rating with the advertisement, each ad may be displayed with a link to the advertiser's information page, or to another page that displays information about the advertiser. After clicking on the link, the user would then be able to see the ratings and/or other information about the advertiser. Rather than displaying a separate link for each ad on the page, a single link may be provided for accessing information about all of the advertisers whose ads appear on the page. For example, the "sponsored links" section 15 illustrated in FIG. 1 could include a single link which reads "Information about these advertisers," and which points to a page that shows, for example, each of the advertisements along with a rating (if available) of the corresponding advertiser. This "composite advertiser information" page could be generated dynamically by the ad placement system. Other information about each advertiser, such as that shown in FIG. 2A and described above, could also be included as part of the composite advertiser information page. The ads reproduced on the composite advertiser information page may be selectable such that the user can click-through to any one of the advertisers' sites.

In another embodiment, selection of the "Information about these advertisers" link could cause the composite advertiser information page to be displayed in a popover, as described above.

Ads and ad campaigns are transient in nature, so the preferred embodiment provides ratings for the advertiser. In other embodiments, the ad placement system may provide functionality for users to rate a particular ad or an ad campaign, in addition or as an alternative to rating the advertiser.

VII. CONCLUSION

The various process steps and methods described herein may be embodied within software modules (computer programs) that are executed by one or more general purpose computers, and may be performed automatically (i.e., without human intervention). These software modules may be stored on or within any suitable computer storage device or medium. As will be appreciated, various combinations of the features and methods described herein may be incorporated into a given system according to the invention. Accordingly, all combinations of the disclosed features and methods fall within the scope of this disclosure.

As will be recognized, the invention may be embodied in a form that does not provide all of the features, benefits and implementation details set forth herein. For example, some of the features described above may be omitted, or may be implemented differently than described above. The scope of the invention is defined only by the claims.

What is claimed is:

1. An ad placement system, comprising:
a first user interface component operative to enable advertisers to specify ads, and to associate such ads with keywords;
a data repository operative to store the ads created via the first user interface component in association with corresponding advertisers and keywords;
an ad server system operative to select ads from the data repository for display on web pages based, at least in part, on the associations between ads and keywords, the ad server system comprising one or more physical servers;
a ratings system comprising computer hardware, the ratings system operative to:
collect and store ratings data for a plurality of ads provided by a selected advertiser, said ratings data collected by the ratings system via a second user interface component that enables users to supply ratings in association with the ads represented in the data repository, calculate an aggregate rating for the selected advertiser based at least partly on the ratings data, output a history user interface including a representation of a second plurality of ads previously selected by a selected one of the users, the history user interface configured to provide functionality for the selected user to choose one of the second plurality of ads to rate; and an incentive determination component that is operative to:

determine whether to provide a discount to the selected advertiser based, at least in part, on the aggregate rating for the selected advertiser;

determine an amount of the discount to be provided to the selected advertiser based at least partly on the aggregate rating;

automatically apply said discount by reducing cost-per-click charges for a plurality of ads of the selected advertiser in connection with ad selection events, such that user ratings of a first ad of the advertiser are taken into consideration in determining a particular discount that is applied to at least a second ad of the advertiser; and take ad click-through rates into consideration in calculating said discounts, such that advertisers whose ads produce higher click-through rates are provided greater discounts than at least some advertisers whose ads produce lower click-through rates.

2. The ad placement system of claim 1, wherein the ratings system is further operative to enable users to rate particular advertisers, and the incentive determination component is further operative to use the advertiser ratings to determine discounts to be given to corresponding advertisers.

3. The ad placement system of claim 1, wherein the incentive determination component is further operative to calculate, for the selected advertiser, a discount that is directly proportional to the aggregate rating of the advertiser.

4. The ad placement system of claim 1, wherein the discounts include free click-through transactions.

5. The ad placement system of claim 1, wherein the ad placement system is further operative to enable a user who is viewing a web page that comprises an ad, as selected for display by the ad server, to supply an associated rating.

6. The ad placement system of claim 1, wherein the ad server system is further operative to use the collected ratings data to supplement an ad, as served for display on a web page, with a visual indication of an aggregate rating of the corresponding advertiser.

7. An ad placement system, comprising:

a first user interface component operative to enable advertisers to specify ads, and to associate such ads with keywords;

a data repository operative to store the ads created via the first user interface component in association with corresponding advertisers and keywords;

an ad server system operative to select ads from the data repository for display on web pages based on the associations between ads and keywords, the ad server system comprising one or more physical servers;

a ratings system comprising computer hardware, the ratings system operative to:

collect and store ratings data in association with particular advertisers, said ratings data collected by the ratings system via a second user interface component that allows for users to supply ratings in association with particular ads represented in the data repository, maintain ad selection histories of particular users, and output a history user interface including a representation of a plurality of ads previously selected by a user that provides functionality for the user to choose one of the plurality of previously selected ads to rate; and an incentive determination component operative to:

calculate an aggregate rating for a selected advertiser based, at least in part, on the ratings data associated with the selected advertiser, determine discounts to provide to particular advertisers based, at least in part, on the aggregate rating, and take ad click-through rates into consideration in determining said discounts, such that advertisers whose ads produce higher click-through rates are provided greater discounts than at least some advertisers whose ads produce lower click-through rates.

8. The ad placement system of claim 7, wherein the ad placement system is further operative to automatically apply said discounts by reducing cost-per-click charges for a plurality of ads of the particular advertisers in connection with ad selection events.

9. The ad placement system of claim 7, wherein the discounts include free click-through transactions.

10. The ad placement system of claim 1, wherein the incentive determination component is further operative to automatically apply said discount to one or more ads subsequently provided by the selected advertiser to the data repository.

11. The ad placement system of claim 7, wherein the ad placement system is further operative to automatically apply said discounts to one or more ads subsequently provided by the selected advertiser to the data repository.

12. The ad placement system of claim 7, wherein the ratings system is further operative to collect and store the ratings data for a plurality of ads provided by a selected advertiser.

13. The ad placement system of claim 7, wherein the incentive determination component is further operative to calculate, for the selected advertiser, a discount that is directly proportional to an aggregate rating of the selected advertiser.

14. The ad placement system of claim 1, further comprising a machine that executes the incentive determination component.

15. The ad placement system of claim 1, wherein the incentive determination component is further operative to determine whether to provide the discount based at least in part on whether a minimum quantity of ratings have been used to calculate the aggregate rating.

16. The ad placement system of claim 1, wherein the incentive determination component is further operative to automatically apply said discount to a second ad although the second ad has not yet been rated by the users.

17. The ad placement system of claim 7, wherein the incentive determination component is further operative to determine whether to provide the discounts to the particular advertisers based at least in part on whether a minimum quantity of ratings have been used to calculate the aggregate rating.

18. The ad placement system of claim 7, wherein the incentive determination component is further operative to apply said discounts to a new ad specified by the selected advertiser, although the new ad has not yet been rated by the users.

* * * * *